L. A. RYAN.
VEHICLE WHEEL HUB.
APPLICATION FILED NOV. 18, 1916.
1,272,119.
Patented July 9, 1918.
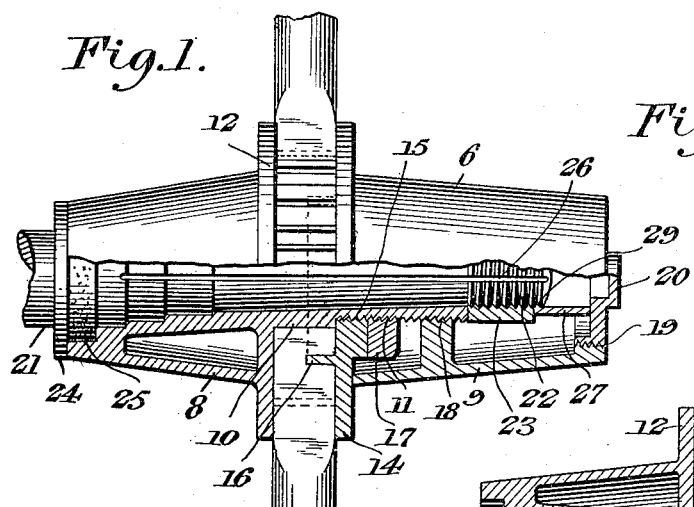
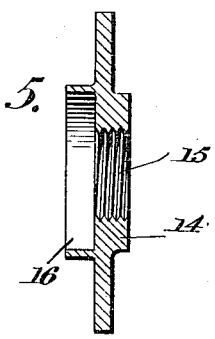
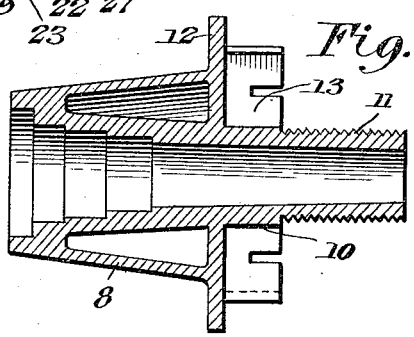
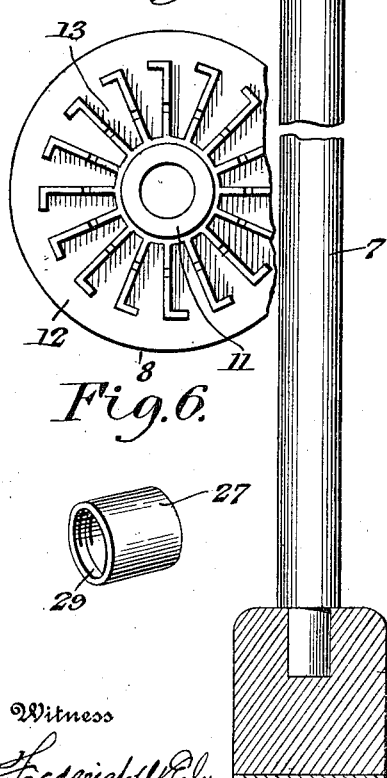
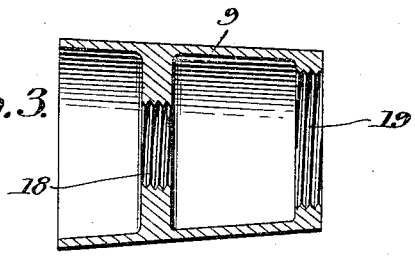
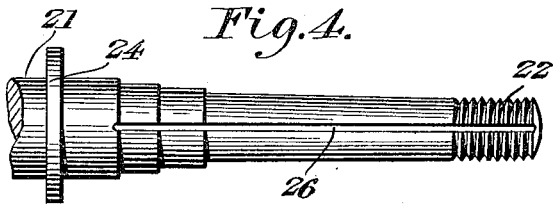
Inventor
L. A. Ryan.
By Victor J. Evans
Attorney
Witness
Frederick W. Ely,

UNITED STATES PATENT OFFICE.

LOUIS A. RYAN, OF EVERETT, MASSACHUSETTS.

VEHICLE-WHEEL HUB.

1,272,119.  Specification of Letters Patent.  Patented July 9, 1918.

Application filed November 18, 1916. Serial No. 132,147.

*To all whom it may concern:*

Be it known that I, LOUIS A. RYAN, a citizen of the Dominion of Canada, residing at Everett, in the county of Middlesex and State of Massachusetts, have invented new and useful Improvements in Vehicle-Wheel Hubs, of which the following is a specification.

The present invention comprehends the provision of a wheel, and more particularly a hub construction therefor, of that type which may be readily assembled or disassembled to permit of the replacement of damaged or broken spokes and fellies without the necessity of first removing the tire from the wheel, after which the parts constituting the hub construction may be assembled in a strong and durable manner and with despatch.

A further object of the invention resides in the provision of means for automatically lubricating the axle ends, bushings, bearings, and nuts without removing the wheel and applying lubrication to such parts thereof.

With the above and other objects in view, the invention consists in the novel features, details of construction and combination of parts which will hereinafter be more fully set forth, illustrated in the accompanying drawing and pointed out in the appended claims.

Figure 1 is an end elevation of a wheel illustrating the hub thereof in longitudinal section;

Fig. 2 is a detail longitudinal sectional view of the inner half of the hub;

Fig. 3 is a longitudinal sectional view of the outer section of the hub;

Fig. 4 is a side elevation of the axle removed from the hub;

Fig. 5 is a view of the detachable flanged collar illustrated in section; and

Fig. 6 is a perspective view of the grease cup.

Fig. 7 is a face view of the flanged collar.

Referring more particularly to the accompanying drawing, 5 denotes the rim or felly of the wheel, 6 the hub thereof and 7 spokes connecting the hub with the felly.

The hub construction here shown comprises an inner section 8 and an outer section 9 adapted for detachable connection with one another.

The inner section 8 is provided with the usual hollow axle box 10 terminating at its inner extremity in an externally threaded extension 11. Formed on the exterior portion of the box 10 at a point rearwardly of the threaded extension 11 thereof is a fixed flanged collar 12 provided with spoke sockets 13. The character 14 denotes a removable flanged collar provided with an axial threaded opening 15 for threadedly engaging the exterior threaded extension 11 of the bushing. When the collar is threaded upon said extension the socket 16 thereof will abut with the socket 13, and serve to detachably hold the spokes 7 in the sockets of the hub, as clearly shown in the drawing. After the detachable flanged collar 14 is applied or threaded upon the extension 11, the same is prevented against any accidental displacement therefrom through the medium of the jam nut 17, which as is obvious from Fig. 1 of the drawing, is threaded upon the threaded extension 11 of the box 10.

The outermost section 9 is of hollow form, and is provided at a point substantially medially of its length, with an axial threaded opening 18 in which is threaded the extension 11 of the bushing, thus detachably connecting the outermost section 9 to the box 10. Provided in the extreme outer end of the outer section 9 is a second threaded opening 19 of greater diameter than the opening 18 for threadedly receiving the cap 20. The axle 21, after being extended within the axle box 10, and the extreme exteriorly threaded end 22 thereof disposed within the outermost section 9 of the hub and in advance of the threaded opening 18 thereof, is secured within the hub through the medium of a nut 23 threaded upon the threaded extension 22 of said axle, better shown in Fig. 1 of the drawing. The disk 24 of the axle is brought into abutting engagement with the extreme inner end of the inner section 8 of the hub and defined against the disk is a packing 25, the purpose of which will be hereinafter more fully explained as the description of the invention is proceeded with.

With this form of hub construction, use is made of means for automatically lubricating the hub and its parts, and to this end the axle 21 is provided substantially throughout its length with a groove 26 in which the lubricant from the grease cup 27 is distributed and the lubricant after being distributed through the axle is prevented from escaping from the hub by the employment of the collar 24 and the packing 25. This grease cup 27 is provided at its rear end with an interiorly threaded portion 29 for threadedly connecting the grease cup to the threaded extremity 22 of the axle.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the appended claims.

What is claimed as new, is:

A device of the class described comprising an inner section consisting of a box having a screw threaded extension and a flanged collar having sockets therein, a second flanged collar having an axially threaded opening therein engaging with the screw threaded extension and a flange coöperating with the before mentioned flange to engage the spokes, an outer section or sleeve having an interior collar intermediate its ends provided with a screw threaded opening engaging with the screw threaded extension, the end of said sleeve being screw threaded and a nut adapted to engage said screw threads.

In testimony whereof I affix my signature.

LOUIS A. RYAN.

Copies of this patent may be obtained for five cents each, by addressing the "Commissioner of Patents, Washington, D. C."